United States Patent [19]
Rosthauser et al.

[11] Patent Number: 6,166,129
[45] Date of Patent: Dec. 26, 2000

[54] PHOTOCHROMIC POLYURETHANES

[75] Inventors: James W. Rosthauser, Pittsburgh; Karl W. Haider, McKees Rocks; Sivaram Krishnan, Pittsburgh, all of Pa.; James N. Rieck, Wheeling, W. Va.

[73] Assignee: Bayer Corporation, Pittsburg, Pa.

[21] Appl. No.: 09/410,524

[22] Filed: Oct. 1, 1999

Related U.S. Application Data

[60] Division of application No. 09/212,789, Dec. 16, 1998, which is a continuation-in-part of application No. 08/999,217, Dec. 29, 1997, abandoned.

[51] Int. Cl.[7] .............................. C08J 3/00; C08K 3/20; C08K 5/34; C08K 5/35; C08L 75/00
[52] U.S. Cl. .................... 524/590; 524/89; 524/90; 524/94; 524/95; 524/104; 524/110; 524/589
[58] Field of Search ................................. 524/89, 90, 94, 524/95, 104, 110, 589, 590

[56] References Cited

U.S. PATENT DOCUMENTS 5,763,511  6/1998  Chan et al. ............................ 524/95
5,775,779  7/1998  Abu-Isa et al. ..................... 297/452.56

FOREIGN PATENT DOCUMENTS

294056 A2  12/1988  European Pat. Off. .

*Primary Examiner*—Patrick D. Niland
*Attorney, Agent, or Firm*—Joseph C. Gil; Lyndanne M. Whalen; Noland J. Cheung

[57] ABSTRACT

The present invention relates to a novel photochromic polyurethane consisting essentially of an isocyanate reactive mixture consisting essentially of: i) from about 40 to about 85% by weight of one or more polyols having a nominal functionality of from 2 to 4 and molecular weights of from 500 to 6000 g/mole; ii) from about 15 to about 60% by weight of one or more diols or triols or mixtures thereof having a functionality of from 2 to 3 and molecular weights of from 62 to 499; b) an aliphatic polyisocyanate having a functionality ranging from about 2 to about 3; and c) a photochromic compound selected from a group consisting of spirooxazines, fulgides, fulgimides, and naphthopyrans, wherein the photochromic compound is present in an amount of 0.01 to 5 parts per hundred parts by weight of the isocyanate reactive mixture.

3 Claims, No Drawings

PHOTOCHROMIC POLYURETHANES

This application is a divisional of prior application Ser. No: 09/212,789, filed Dec. 16, 1998, which is a continuation-in-part (CIP) of prior application Ser. No: 08/999,217, filed Dec. 29, 1997, now abandoned.

FIELD OF THE INVENTION

The present invention relates to polyurethanes with improved photochromic behavior.

BACKGROUND OF THE INVENTION

Articles which have organic photochromic material(s) applied to or incorporated therein are characterized in that upon exposure to electromagnetic radiation or to solar light they exhibit a reversible change in color and in light transmission. Once the exposure to the original radiation has been discontinued, the composition returns to its original color, or colorless state. Recently, photochromic plastic materials, most notably, such compositions which may be suitable for the preparation of ophthalmic lenses, films and automotive head lamp lenses have been the focus of attention in the relevant arts. Plastic materials as the medium for the preparation of such lenses allow for the preparation of lighter and thinner lenses than do the traditionally used glass. Also of interest are the applications of photochromic technology to automotive, aircraft transparencies and greenhouse architecture and other glazing applications. It is known that photochromic behavior may be imparted to glass and to certain plastic materials by using inorganic and organic dyes respectively. Photochromic articles prepared from synthetic organic resins such as homopolymers of a poly(allyl carbonate) monomer are known (U.S. Pat. Nos. 4,994,208, 5,246,630, 5,221,721 and 5,200,483).

U.S. Pat. No. 5,244,602 describes a naphthopyran useful for photochromic polymers and also organic hosts such as polyurethanes for such materials. However, a detailed description of the polyurethane is not given.

In McBain, et al. (U.S. Pat. No. 4,994,208), it was demonstrated that photochromic performance of matrices prepared by the free radical polymerization of polyol (allyl carbonates), e.g., diethylene glycol bis(allyl carbonate), could be improved by the incorporation of 10 to 40 weight percent of an aliphatic polyurethane having terminal ethylenic unsaturation. The polyurethanes described in this reference can be represented by the following expression:

D-R-B-A-B-R-D

Here, D represents the terminal functional group containing ethylenic unsaturation, R represents a bivalent alkylene group containing from 1 to 10 carbon atoms, B represents an aliphatic bis carbamate moiety originating from the corresponding aliphatic diisocyanate, and A represents the residue of a saturated aliphatic polyol (e.g., a $C_2$–$C_6$ alkane diol, a polyether, polyester, or polycarbonate diol). In these systems, the polyurethane having terminal ethylenic unsaturation undergoes free radical polymerization with the polyol (allyl carbonate) to form a urethane containing copolymer.

In Selvig (U.S. Pat. No. 5,200,483), it was shown that the compositions described in McBain, et al. could be improved upon (in terms of casting pot life and yellowness) by using appropriate mixtures of allyl and acrylyl groups for the terminal unsaturation in the polyurethanes.

The technology described by Selvig and McBain, et al. requires either a photochromic dye which is resistant to the effects of the peroxy type initiator (see Selvig, Col. 11, lines 53–56) or a secondary processing step, in which the dye is "imbibed" into the finished polymer matrix. (see Selvig, Examples 7 and 10).

Surprisingly, we have now found that polyurethane matrices of the inventive composition are optically clear and have excellent photochromic performance. Since the systems described in our invention do not cure by a free radical mechanism, commercially available photochromic dyes can be added during the casting stage, without interfering in the cure of the polymer or without detriment to the dye's ultimate performance.

SUMMARY OF THE INVENTION

The present invention relates to a novel photochromic polyurethane comprising an isocyanate reactive mixture comprising: i) from about 40 to about 85% by weight of one or more polyols having a nominal functionality of from 2 to 4 and molecular weights of from 500 to 6000 g/mole; ii) from about 15 to about 60% by weight of one or more diols or triols or mixtures thereof having a functionality of from 2 to 3 and molecular weights of from 62 to 499; b) an aliphatic polyisocyanate having a functionality ranging from about 2 to about 3; and c) a photochromic compound selected from a group consisting of spirooxazines, fulgides, fulgimides, and naphthopyrans, wherein the photochromic compound is present in an amount of 0.01 to 5 parts per hundred parts by weight of the isocyanate reactive mixture.

An object of the present invention is to produce a transparent polyurethane material in which the photochromic dyes fade back to the "uncolored state" rapidly, that is, the absorbance of this novel polyurethane returns to less than 50% of the "colored state" within two minutes after the light source is removed. This is accomplished by adding an appropriate amount of a high molecular weight polyol component into a polyurethane.

DETAILED DESCRIPTION OF THE INVENTION

The photochromic polyurethane of the present invention comprises an isocyanate reactive mixture comprising from about 40 to about 85% by weight, preferably 50 to 70% by weight, of one or more polyols having a nominal functionality of from 2 to 4 and molecular weights of from 500 to 6000 g/mole; ii) from about 15 to about 60% by weight, preferably 30 to 50% by weight, of one or more diols or triols or mixtures thereof having a functionality of from 2 to 3 and molecular weights of from 62 to 499 and b) an aliphatic polyisocyanate having a functionality of less than about 3, preferably 2.

The polyols of the present invention are those conventionally employed in the art for the preparation of polyurethane cast elastomers. Preferably, the polyols have molecular weights (number average) within the range of 500 to 6,000, preferably 1000 to 3,000. The functionality of the polyol ranges from about 2 to 4, preferably about 2.0. From about 40 to 85 percent by weight of these polyols are present in the isocyanate reactive mixture. Naturally, and often times advantageously, mixtures of such polyols are also possible. Examples of the suitable polyols include polyether polyols, polyester polyols, and polycarbonate polyols.

Suitable polyether polyols are known, for example, from German Offenlegungsschrift 2,905,975, for example, such as polypropylene glycol. Other suitable polyethers are also derived from propylene oxide and/or ethylene oxide with molecular weights of about 500 to 6000 (OH numbers of 225 to 19) based on difunctional starters such as water, ethylene glycol or propylene glycol are also preferred. These preferred compounds include copolymers of ethylene oxide and propylene oxide with about 0 to 20% by weight of the oxides being ethylene oxides. Poly(tetramethylene glycol) diols having molecular weights of about 500 to 5000 (OH numbers of 18.7 to 224) are also preferred.

The suitable polyester polyols include the ones which are prepared by polymerizing ε-caprolactone using an initiator such as ethylene glycol, ethanolamine and the like. Further suitable examples are those prepared by esterification of polycarboxylic acids. Further suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1, 2) and -(1,3); butylene glycol-(1,4) and -(1,3); hexanediol-(1,6); octanediol-(1,8); neopentyl glycol; (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. A preferred polyester polyol is butylene adipate.

Suitable diols and triols with molecular weights of 62 to 499 used in the present invention include the polyhydric alcohols listed to form polyester polyols. Triols such as trimethylolpropane (TMP), glycerine or low MW polypropylene oxide polyols prepared from these or similar trifunctional starters are preferred.

A suitable polycarbonate polyol includes polyhexamethylene carbonate. Polycarbonates based on diols listed above are prepared by the reaction of the diol and a dialkyl carbonate as described in U.S. Pat. No. 4,160,853.

Suitable additives for use in the present invention include the tin catalysts.

In accordance with the present invention, the aliphatic polyisocyanate component, having a viscosity of less than about 20,000 mPa·s at 25° C. and having an average NCO functionality of 2 to 3, most preferably about 2, is generally in the form of an NCO prepolymer or a polyisocyanate adduct, more preferably a polyurethane prepolymer. Suitable polyisocyanate adducts for the present invention may be based, for example, on organic aliphatic diisocyanates including, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, and mixtures thereof. It is preferred that the isocyanate be based on mixtures of the various stereoisomers of bis-(4-isocyanatocyclohexl)-methane.

The dyes suitable in the context of the invention are photochromic compounds selected from the group consisting of benzopyrans, naphthopyrans, spirobenzopyrans, spironaphthopyrans, spirobenzoxazines, spironaphthoxazines, fulgides and fulgimides. Such photochromic compounds have been reported in the literature including U.S. Pat. Nos. 4,826,977; 4,931,221; 5,106,998; 5,552,090; 5,628,935 and 5,565,147 (all incorporated herein by reference).

The color range of the naphthopyrans suitable in the present invention is 410 to 500 nm, thus they impart a yellow or orange coloration in their darkened state. In the faded, or bleached condition, the materials exhibit a colorless or pale yellow coloration. The present invention may be used in a mixture or combined with suitable organic photochromic compounds, to obtain, after activation, the formation of neutral coloring such as green, brown and grey. Particularly useful for the purpose are photochromic compounds belonging to the group of naphthopyrans, spiro-indolino-oxazines and spiro-indolino pyrans which are known and are available in commerce. These have a high quantum efficiency for coloring, a good sensitivity and saturated optical density, and an acceptable bleach or fade rate. These compounds may be represented by the following graphic formulae IA1, IA2, and IA3 in which the letters a through n represent the sides of the naphthopyran rings, and the numbers represent the numbering of the ring atoms of the naphthopyrans:

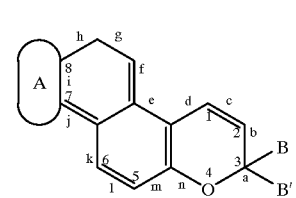

IA1

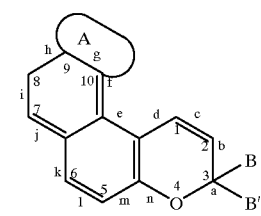

IA2

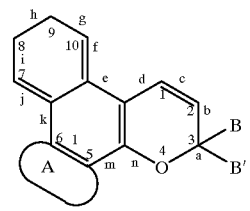

IA3

In graphic formulae IA1, IA2, and IA3, the group represented by A is a substituted or un-substituted, five or six member heterocyclic ring fused to the g, i, or I side of the naphthopyran and is represented by the following graphic formulae IIA through IIF:

IIA
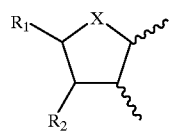

IIB
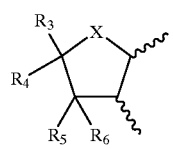

IIC
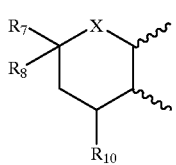

IID
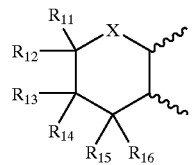

IIE
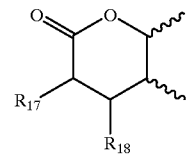

IIF
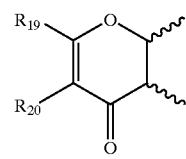

In graphic formulae IIA through IID, X may be an oxygen or a nitrogen atom, the nitrogen atom being substituted with hydrogen or a $C_1$–$C_4$ alkyl. $R_1$ may be hydrogen, $C_1$–$C_6$ alkyl, substituted or unsubstituted phenyl, carboxy, or $C_1$–$C_6$ alkoxycarbonyl. Preferably, $R_1$ is hydrogen, $C_1$–$C_3$ alkyl, substituted or unsubstituted phenyl, carboxy, or $C_1$–$C_3$ alkoxycarbonyl. $R_2$ may be hydrogen, $C_1$–$C_6$ alkyl, or substituted or unsubstituted phenyl. Preferably, $R_2$ is hydrogen, $C_1$–$C_3$ alkyl, or substituted or unsubstituted phenyl. $R_3$ and $R_4$ may each be hydrogen, $C_1$–$C_6$ alkyl or phenyl. Preferably, $R_3$ and $R_4$ are each hydrogen, $C_1$–$C_3$ alkyl, or phenyl, $R_5$ and $R_6$ may each be hydrogen, $C_1$–$C_6$ alkyl, phenyl, hydroxy, $C_1$–$C_6$ alkoxy, or acetoxy. Preferably, $R_5$ and $R_6$ are each hydrogen, $C_1$–$C_3$ alkyl, phenyl, hydroxy, $C_1$–$C_3$ alkoxy, or acetoxy, $R_7$, $R_8$, and $R_{10}$ may each be hydrogen, $C_1$–$C_6$ alkyl, or phenyl, provided that when $R_7$ is phenyl, $R_8$ is hydrogen or $C_1$–$C_6$ alkyl and when $R_8$ is phenyl $R_7$ is hydrogen or $C_1$–$C_6$ alkyl. Preferably, $R_7$, $R_8$, and $R_{10}$ are each hydrogen, $C_1$–$C_3$ alkyl, or phenyl. Most preferably, $R_1$, $R_2$, $R_3$, $R_4$, $R_5$, $R_6$, $R_7$, $R_8$, and $R_{10}$ are each hydrogen or methyl. $R_{11}$, $R_{12}$, $R_{13}$, $R_{14}$, $R_{15}$, and $R_{16}$ may each be hydrogen, $C_1$–$C_6$ alkyl, $C_1$–$C_6$ alkoxy, or phenyl, Preferably, $R_{11}$, $R_{12}$, $R_{13}$, $R_{14}$, $R_{15}$, and $R_{16}$ are each hydrogen, $C_1$–$C_3$ alkyl, $C_1$–$C_3$ alkoxy, or phenyl. Most preferably, $R_{11}$, $R_{12}$, $R_{13}$, $R_{14}$, $R_{15}$, and $R_{16}$ are each hydrogen, methyl, or methoxy.

In graphic formulae IIE and IIF, $R_{17}$ may be hydrogen, $C_1$–$C_6$ alkyl, substituted or unsubstituted phenyl, or halogen. Preferably, $R_{17}$ is hydrogen, $C_1$–$C_3$ alkyl, substituted or unsubstituted phenyl, or halogen. Most preferably, $R_{17}$ is hydrogen, methyl, or chloro. $R_{18}$ may be hydrogen, $C_1$–$C_6$ alkyl, phenyl, carboxy, $C_1$–$C_6$ alkoxy-carbonyl, or $C_1$–$C_6$ haloalkoxycarbonyl. Preferably, $R_{18}$ is hydrogen, $C_1$–$C_3$ alkyl, phenyl, carboxy, $C_1$–$C_3$ alkoxycarbonyl, or $C_1$–$C_3$ haloalkoxycarbonyl. $R_{19}$ and $R_{20}$ may each be hydrogen, $C_1$–$C_6$ alkyl, or phenyl. Preferably, $R_{19}$ and $R_{20}$ are each hydrogen, $C_1$–$C_3$ alkyl, or phenyl. Most preferably, $R_{18}$, $R_{19}$, and $R_{20}$ are each hydrogen or methyl. $R_1$–$R_{20}$ the phenyl substituents may be $C_1$–$C_3$ alkyl and the halogen or (halo) groups may be chloro or bromo.

In graphic formulae IA1, IA2, and IA3, B and B' may each be selected from the group consisting of (i) the substituted or unsubstituted aryl groups phenyl and naphthyl; (ii) the substituted or unsubstituted heterocyclic aromatic groups pyridyl, furyl, benzofuryl, thienyl, and benzothienyl; and (iii) B and B' taken together form the adamantyl group. The aryl and heterocyclic substituents of B and B' may each be selected from the group consisting of hydroxy, $C_1$–$C_3$ alkyl, $C_1$–$C_5$ haloalkyl, which includes mono-, di-, and trihalo substituents, $C_1$–$C_5$ alkoxy, $C_1$–$C_5$ alkoxy($C_1$–$C_4$) alkyl, $C_1$–$C_5$ dialkylamino, acryloxy, methacryloxy, and halogen, said halogen or (halo) groups being fluoro, chloro, or bromo.

Preferably, B and B' are represented respectively by the following graphic formulae:

IIIA
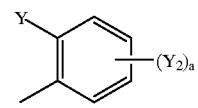

IIIB
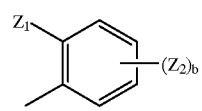

In graphic formulae IIIA and IIIB, $Y_1$ and $Z_1$ may each be selected from the group consisting of hydrogen, $C_1$–$C_5$ alkyl, $C_1$–$C_5$ alkoxy, fluoro, and chloro; $Y_2$ and $Z_2$ are each selected from the group consisting of $C_1$–$C_5$ alkyl, $C_1$–$C_5$ alkoxy, hydroxy, halogen, e.g., chloro, fluoro, and bromo, acryloxy, and methacryloxy, and a and b are each integers from 0 to 2. Most preferably, $Y_1$ and $Z_1$ are each hydrogen, $C_1$–$C_3$ alkyl, $C_1$–$C_3$ alkoxy, or fluoro, $Y_2$ and $Z_2$ are each $C_1$–$C_3$ alkyl or $C_1$–$C_3$ alkoxy, a is the integer 0 or 1, and b is an integer from 0 to 2.

The preferred naphthopyrans of the present invention are represented in the following graphic formula IB. In graphic formula IB, the A group represents formulae IIA through IID with X being an oxygen atom, formulae IIE and IIF. The A group is fused so that the oxygen atom of formulae IIA through IIF is attached to the number 8 carbon atom of the naphtho portion of the naphthopyran.

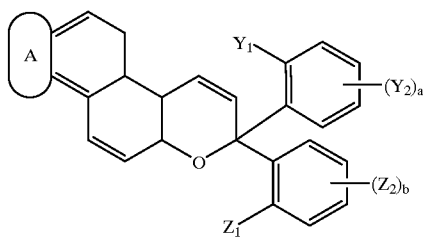

IB

A still preferred dye may be described as naphthopyrans substituted at the 3 position of the pyran ring with (i) an aryl substituent and (ii) a phenyl substituent having a 5- or 6-member oxygen and/or nitrogen containing heterocyclic ring fused at the number 3 and 4 carbon atoms of the phenyl substituent and with a nitrogen-containing heterocyclic ring at the 6 position of the naphthyl portion of the naphthopyran compound. These compounds may be represented by the following graphic formula:

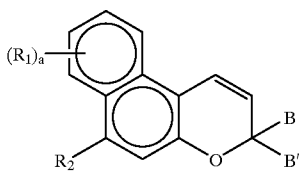

I

In graphic formula I, $R_1$ may be $C_1$–$C_{10}$ alkyl, halogen, or the group, —O—L, wherein L is a $C_1$–$C_{12}$ alkyl, e.g., methyl, ethyl, propyl, butyl, pentyl, hexyl, heptyl, octyl, nonyl, decyl, undecyl, and dodecyl, said halogen being chloro, fluoro, or bromo, and a is the integer 0, 1 or 2. Preferably, $R_1$ is $C_1$–$C_5$ alkyl, fluoro, bromo or the group, —O—L, wherein L is $C_1$–$C_4$ alkyl and a is the integer 0 or 1. Most preferably, $R_1$ is $C_1$–$C_3$ alkyl, fluorine or the group —O—L, wherein L is methyl, and a is the integer 0 or 1.

In graphic formula I, $R_2$ may be a saturated, unsubstituted or mono- or di-substituted nitrogen containing heterocyclic group selected from the following groups represented by graphic formulae IA through IG:

IA

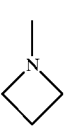

IB

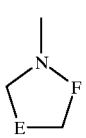

IC

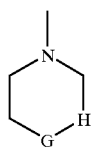

ID

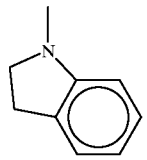

IE

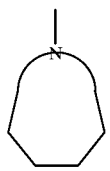

IF

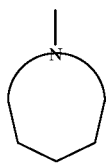

IG wherein E and F in graphic formula IC, are each a nitrogen or carbon atom, provided that when E is nitrogen, F is a carbon atom, and G in graphic formula ID, is a nitrogen, oxygen, or carbon atom and H is a nitrogen or carbon atom, provided that when H is nitrogen, G is a carbon atom. Examples of $R_2$ groups include aziridino, azetidino, 1-pyrrolidyl, 1-pyrrolinyl, 1-imidazolidyl, 2-imidazolin-1-yl, 2-pyrazolidyl, 3-pyrazolin-2-yl, morpholino, piperidino, piperazinyl, 4-methyl-1-piperazinyl, 1,4,5,6,-tetrahydropyrimidinyl, 1-indolinyl, hexamethyleneimino, and heptamethyleneimino. The substituents for $R_2$ can be $C_1$–$C_6$ alkyl and/or $C_1$–$C_6$ alkoxy. Preferably, $R_2$ is an unsubstituted or mono-substituted member of the group consisting of indolinyl, morpholino, and piperidino. More preferably, $R_2$ is morpholino.

B may be the substituted or unsubstituted aryl group, naphthyl or phenyl, said aryl substituents being $C_1$–$C_5$ alkyl, halo($C_1$–$C_5$)alkyl, hydroxy, $C_1$–$C_5$ alkoxy, $C_1$–$C_4$ alkoxy ($C_1$–$C_4$)alkyl, halogen, morpholino, piperidino, or R(R") N—, wherein R and R" are each hydrogen or $C_1$–$C_3$ alkyl, said halogen (or halo) groups being fluoro or chloro. Preferably, B is represented by the following graphic formula II:

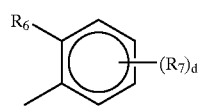

II

In graphic formula II, $R_6$ is hydrogen, $C_1$–$C_4$ alkyl, $C_1$–$C_4$ alkoxy, fluoro, or chloro and each $R_7$ is a $C_1$–$C_4$ alkyl, $C_1$–$C_4$ alkoxy, hydroxy, chloro, or fluoro and d is an integer from 0 to 2. Preferably, $R_6$ is hydrogen and $R_7$ is selected from the group consisting of fluoro, methyl and methoxy.

B' may be represented by one of the following graphic formulae III or IV:

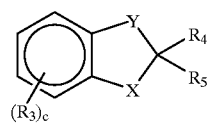

III

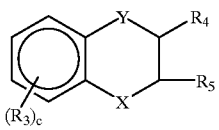

IV

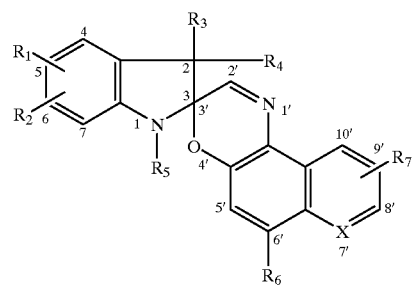

(I)

In graphic formula III and IV, X is oxygen or nitrogen and Y is carbon or oxygen, provided that when X is nitrogen, Y is carbon; $R_4$ and $R_5$ are each hydrogen or $C_1$–$C_5$ alkyl; each $R_3$ is a $C_1$–$C_5$ alkyl, $C_1$–$C_5$ alkoxy, hydroxy, or halogen, said halogen substituent being chloro, fluoro, or bromo, and c is an integer from 0 to 3, e.g., 0, 1, 2, or 3. Preferably, B' is represented by graphic formula III or IV, wherein X is oxygen; Y is carbon or oxygen; $R_4$ and $R_5$ are each hydrogen or $C_1$–$C_4$ alkyl; each $R_3$ is a $C_1$–$C_4$ alkyl, $C_1$–$C_4$ alkoxy, hydroxy, or fluoro; and c is the integer 0, 1 or 2. Most preferably, B' is 2,3-dihydroxybenzofuran-5-yl, 2-methyldihydroxybenzofuran-5-yl, indoline-5-yl, 1,2,3,4-tetrahydroquinoline-6-yl, chroman-6-yl or 1,3-benzodioxole-5-yl.

In graphic formula III, when $R_4$ and $R_5$ are H and when X is oxygen and Y is carbon and c is zero, the group is a 2,3-dihydrobenzo-furan-5-yl; when X is oxygen and Y is oxygen and c is zero, the group is 1,3-benzodioxole-5-yl; and when X is nitrogen and Y is carbon and c is zero, the group is indoline-5-yl. In graphic formula IV, when X is oxygen and Y is carbon, the unsubstituted group is a chroman-6-yl; when X is oxygen and Y is oxygen, the unsubstituted group is a 1,4-benzodioxan-6-yl; and when X is nitrogen and Y is carbon, the unsubstituted group is 1,2,3,4-tetrahydroquinoline-6-yl. For brevity, these groups will be referred to herein as fused heterocyclicphenyl groups.

The preferred naphthopyran dye is 3,3-diphenyl-3-H-naphtho[2,1-b]pyran represented by the formula

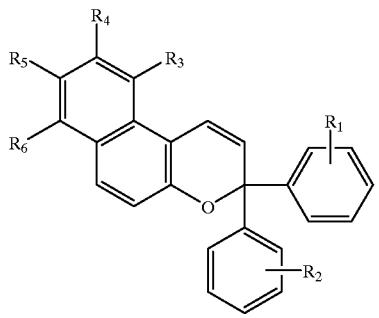

where $R_1$ to $R_6$ denote hydrogen.

The spiroxazines suitable in the present invention are known: see for instance U.S. Pat. Nos. 3,562,172; 3,578,602; 4,215,010 and 4,342,668, all of which are incorporated by reference herein. Essentially, the spirooxazines suitable in the present invention may be described by the formula where:

$R_1$ and $R_2$ independently represent a hydrogen or halogen (fluorine, chlorine or bromine) atom or a group chosen from $C_1$–$C_5$ linear or branched alkyl, $C_1$–$C_5$ perfluoroalkyl, $C_1$–$C_5$ alkoxy, nitro or cyano;

$R_3$ and $R_4$ independently represent $C_1$–$C_5$ linear or branched alkyl, phenyl or benzyl groups; or $R_3$ and $R_4$ when considered jointly with the carbon atom to which they are linked form a $C_5$–$C_8$ cycloalkyl group;

$R_5$ represents a $C_1$–$C_5$ linear or branched alkyl, phenyl, benzyl or allyl group;

$R_6$ represents a hydrogen atom or a $C_1$–$C_5$ linear or branched alkyl group or the group —$NR_8R_9$ where $R_8$ is a $C_1$–$C_5$ linear or branched alkyl, phenyl or benzyl group, $R_9$ is hydrogen or has the same meaning as $R_8$, or $R_8$ and $R_9$ when considered jointly with the nitrogen atom to which they are linked form a cyclic structure comprising 5–12 members and possibly containing a further heteroatom chosen from oxygen and nitrogen; and $R_7$ represents a hydrogen or halogen (fluorine, chlorine or bromine) atom or a group chosen from: $C_1$–$C_5$ linear or branched alkyl, $C_1$–$C_5$ alkoxy, cyano, thio-ether and carboxylated ester with 1–3 carbon atoms in the ester portion, or represents an aromatic or heterocyclic condensed ring;

X represents CH or N—.

In particular, the groups $R_1$ and $R_2$, when not hydrogen, can be linked in any of positions 4, 5, 6 and 7 of the indoline part of the molecule. In addition, the group $R_7$, if not representing hydrogen or an aromatic or heterocyclic condensed ring, can be present in any of the positions 7', 8', 9' and 10' of the naphthalene part of the molecule.

In the preferred embodiment, photochromatic compounds corresponding to general formula (I) are used in which:

$R_1$ and $R_2$ independently represent a hydrogen atom or the methyl group;

$R_3$ and $R_4$ each represent the methyl group or jointly represent the cyclohexyl group;

$R_5$ represents the methyl group;

$R_6$ represents a hydrogen atom or the —$NR_8R_9$ group where the groups $R_8$ and $R_9$ together with the nitrogen atom to which they are linked form a piperidyl, morpholyl, pyrrolidyl or hexamethyleneimino ring structure; and $R_7$ represents a hydrogen atom; and X represents CH.

Examples of preferred photochromatic compounds used according to the present invention are 1,3,3,4,5- or 1,3,3,5,6-pentamethyl Spiro (indoline-2,3'-[3H]-naphtho-(2,1-b)-(1,4)-oxazine); 1,3,3-trimethyl Spiro (indoline-2,3'-[3H]- naphtho-2,1-b)-(1,4)-oxazine); 1,3,3-trimethyl Spiro (indoline-6-(1-piperidyl)-2,3'-[3H]-naphtho-2,1-b)-(1,4)-oxazine; 1,3,3-trimethyl Spiro (indoline-6'-(1-morpholyl)-2, 3'-[3H]-naphtho-(2,1-b)-(1,4)-oxazine); 1,3,3,4,5- or 1,3,3, 5,6-pentamethyl spiro (indoline-6'-(1-piperidyl)-2,3'-[3H]-naphtho-(2,1-b)-(1,4)-oxazine); and 1,3,3-trimethyl spiro (indoline-6'-(1-piperidyl)-9'-(methoxy)-2,3'-[3H]-naphtho-(2,1-b)-(1,4)-oxazine).

The spiropyrans useful for the purposes of the present invention, are photochromatic organic compounds which can be defined by the following general formulae (II), (III), (IV) and (V):

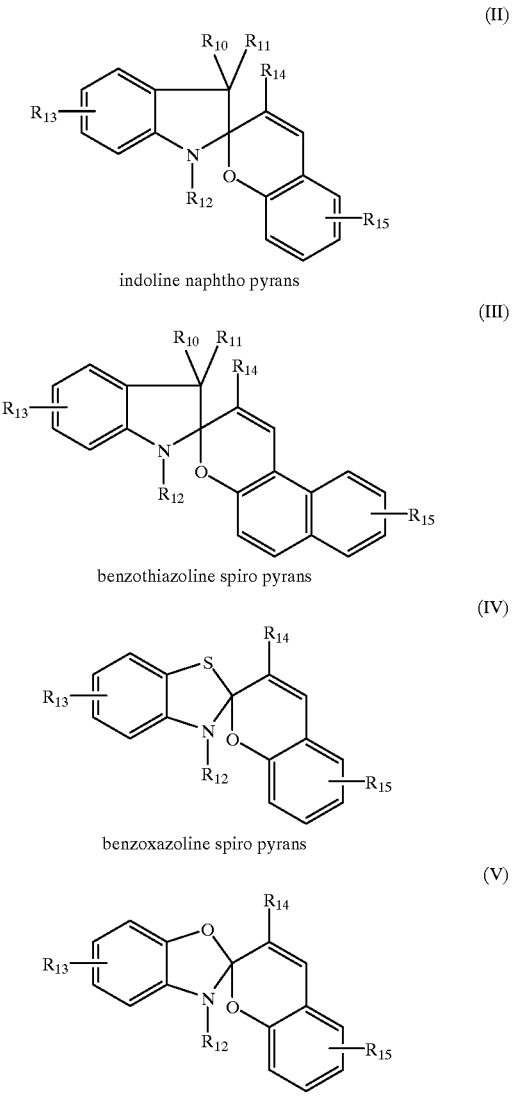

indoline naphtho pyrans (II)

benzothiazoline spiro pyrans (III)

benzoxazoline spiro pyrans (IV)

(V)

in the preceding general formulae:

$R_{10}$ and $R_{11}$ represent alkyl or aryl groups;

$R_{12}$ represents an alkyl, aryl group or alkyl substituted group (such as hydroxyalkyl, halogenalkyl, carbalcoxyalkyl, alkoxyalkyl and aminoalkyl);

$R_{14}$ represents hydrogen or an alkyl, aryl or alkoxy; and $R_{13}$ and $R_{15}$ represent hydrogen or mono- or poly-substitution groups, chosen among alkyl and substituted alkyl groups, or halogen, nitro or alkoxy.

Fulgides and fulgimides suitable in the context of the invention are known and have been described in the litera-ture (see, for instance, Applied Photochromic Polymer Systems, Edited by C. B. McArdle, Blackie USA: Chapman & Hall, New York, 1992, pp. 80–120) incorporated by reference herein.

The inventive composition may be used in applications requiring photochromic materials which were referred to above. Included are photochromic lenses such as are described in U.S. Pat. No. 5,531,940, the specification of which is incorporated herein by reference.

The invention is further illustrated but is not intended to be limited by the following examples in which all parts and percentages are by weight unless otherwise specified.

EXAMPLES

The following components were used to prepare the elastomers of this invention as illustrated in the examples:

| | |
|---|---|
| Polyol A: | A polytetramethylene glycol diol having an OH number of 112 mg KOH/g and a number average MW of ~1000 g/mole. |
| Polyol B | A polypropylene glycol diol having an OH number of 112 mg KOH/g and a number average MW of ~1000 g/mole. |
| Polyol C | A polyhexamethylene carbonate diol having an OH number of 56 mg KOH/g and a number average MW of ~2000 g/mole. |
| Polyol D | A polybutylene adipate diol having an OH number of 56 mg KOH/g and a number average MW of ~2000 g/mole. |
| Polyol E | A polypropylene glycol triol having an OH number of 550 mg KOH/g and a number average MW of ~306 g/mole. |
| Polyol F | A polypropylene glycol triol having an OH number of 370 mg KOH/g and a number average MW of ~455 g/mole. |
| Catalyst Solution: | A solution of 1 g of dibutyltin dilaurate and 99 g of Polyol A. |
| Isocyanate A: | The isocyanate was a mixture of isomers of 4,4'-dicyclohexylmethanediisocyanate having an isomer ratio of ~20% by weight trans, trans, 50% by weight cis, trans, and 30% by weight cis, cis isomer. |
| Photo-chromic Dye A: | 3,3-diphenyl-3-H-naphtho[2,1-b]pyran, available commercially as Variacrol Yellow L from Great Lakes Chemical Company |
| Photo-chromic Dye B: | 1,3-dihydro-1,3,3-trimethyl-spiro-2H-indole-2,3'-(3H)-naphtho(2,1-b)(1,4)oxazine available as Variacrol Blue A from the Great Lakes Chemical Company |

Examples 1–10 illustrate the preparation of prepolymers that are used to prepare the photochromic materials of this invention.

Example 1

In a 3-necked flask equipped with an overhead stirrer, thermocouple, and a vacuum adapter, Isocyanate A (690.6 g; 5.26 eq.) was charged into the reactor and stirred at ambient temperature. Polyol A (809.4 g; 1.62 eq.) was preheated in an oven to 80° C. and added to the reactor. The mixture was allowed to stir for ~15 minutes, before adding Catalyst Solution A. (3.75 g). The reaction flask was evacuated (<0.1 mm HG) and held at 90° C. for 3.5 hours. An aliquot of the prepolymer was withdrawn and titrated for isocyanate content using standard n-butyl amine titration. The isocyanate content was found to be 9.92% (theory; 10.2%).

Example 2

In a 3-necked flask equipped with an overhead stirrer, thermocouple, and a vacuum adapter, Isocyanate A (1062.0 g; 8.09 eq.) was charged into the reactor and stirred at ambient temperature. Polyol A (438.1 g; 0.876 eq.) was preheated in an oven to 80° C. and added to the reactor. The mixture was allowed to stir for ~15 minutes, before adding catalyst solution A (3.75 g). The reaction flask was evacuated (<0.1 mm HG) and held at 90° C. for 3.0 hours. An aliquot of the prepolymer was withdrawn and titrated for isocyanate content using standard n-butyl amine titration. The isocyanate content was found to be 19.80% (theory; 20.2%).

Example 3

In a 3-necked flask equipped with an overhead stirrer, thermocouple, and a vacuum adapter, Isocyanate A (284.6 g; 2.17 eq.) was charged into the reactor and stirred at ambient temperature. Polyol B (333.5 g; 0.667 eq.) was added to the reactor at ambient temperature. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 9.92% (theory; 10.2%).

Example 4

In a 3-necked flask equipped with an overhead stirrer, thermocouple, and a vacuum adapter, Isocyanate A (437.6 g; 3.34 eq.) was charged into the reactor and stirred at ambient temperature. Polyol B (180.5 g; 0.361 eq.) was added to the reactor at ambient temperature. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 19.90% (theory; 20.2%).

Example 5

In a 3-necked flask equipped with an overhead stirrer, thermocouple, and a vacuum adapter, Isocyanate A (246.6 g; 1.88 eq.) was charged into the reactor and stirred at ambient temperature. Polyol C (372.8 g; 0.373 eq.) was added to the reactor at ca. 80° C. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 9.95% (theory; 10.2%).

Example 6

In a 3-necked flask equipped with an overhead stirrer, thermocouple, and a vacuum adapter, Isocyanate A (417.2 g; 3.18 eq.) was charged into the reactor and stirred at ambient temperature. Polyol C (201.8 g; 0.202 eq.) was added to the reactor at ca 80° C. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 19.93% (theory; 20.2%).

Example 7

In a 3-necked flask equipped with an overhead stirrer, thermocouple, and a vacuum adapter, Isocyanate A (246.2 g; 1.88 eq.) was charged into the reactor and stirred at ambient temperature. Polyol D (372.8 g; 0.373 eq.) was melted in an oven at ~80° C. and added to the reactor. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 9.90% (theory; 10.2%).

Example 8

In a 3-necked flask equipped with an overhead stirrer, thermocouple, and a vacuum adapter, Isocyanate A (417.2 g; 3.18 eq.) was charged into the reactor and stirred at ambient temperature. Polyol D (201.8 g; 0.202 eq.) was melted in an oven at ~80° C. and added to the reactor. Catalyst A (1.55 g) was added and the reaction mixture was heated (90° C.) under vacuum (<0.1 mm Hg) for 4 hours. An aliquot of the prepolymer was withdrawn and titrated for isocyanate content using standard n-butyl amine titration. The isocyanate content was found to be 19.90% (theory; 20.2%).

Example 9

In a 3-necked flask equipped with an overhead stirrer, thermocouple, and a vacuum adapter, Isocyanate A (559.0 g: 4.26 eq.) was charged into the reactor and stirred at ambient temperature. Polyol A (338.7 g; 0.677 eq.) was preheated in an oven to 80° C. and added to the reactor. The mixture was allowed to stir for ~15 minutes, before adding catalyst solution A. (2.25 g). The reaction flask was evacuated (<0.1 mm HG) and held at 90° C. for 3.0 hours. An aliquot of the prepolymer was withdrawn and titrated for isocyanate content using standard n-butyl amine titration. The isocyanate content was found to be 16.40% (theory; 16.7%).

Example 10 (comparative example)

Isocyanate A (554.9 g; 4.23 eq.), Polyol E (45.1 g; 0.442 eq.) and catalyst solution A (1.5 g) were combined at room temperature in a 3-necked flask equipped with an overhead stirrer, thermocouple, and a vacuum adapter. The mixture was allowed to stir under vacuum (<0.1 mm HG) as the temperature was increased over ~30 minutes to 100° C. After 4 hours at 100° C., an aliquot was removed and titrated for isocyanate content (found 26.3% NCO; theory; 26.5%).

Examples 11–36

General Procedure for Preparing the Photochromic Polyurethanes

The prepolymers from Examples 1–10 were cast to form photochromic polyurethanes according to the following general procedure. The prepolymer was heated in vacuo (<0.1 mm HG) with stirring to 80° C. and the photochromic dye was added at a level sufficient to give 0.1 wt. % in the cast polyurethane material. The amount of prepolymer indicated in Table 1 was weighed into a disposable glass container. The desired chain extender was warmed in an oven to 60° C. before combining with the prepolymer. The mixture was stirred for ~30 seconds and subsequently poured into an aluminum tray (~3"×6"×1") that had been pre-treated with a silicone based mold release (MR 515) available from ChemTrend Inc. The tray containing the casting was cured in an oven (110° C.) for 18 hours. The plaque was removed from the tray and analyzed for photochromic behavior as described below.

TABLE 1

Description of Elastomers Example 11 through 22

| Ex. | Prepolymer (Ex. #) | Prepolymer Amount (g:meq) | Chain Extender Type | Chain Extender (g:meq) | Photochromic Dye |
|---|---|---|---|---|---|
| 11 | 1 | 90.8:214 | 1,4-butanediol | 9.17:204 | B |
| 12 | 1 | 90.8:214 | 1,4-butanediol | 9.17:204 | A |
| 13 | 2 | 83.2:392 | 1,4-butanediol | 16.8:373 | B |
| 14 | 2 | 83.2:392 | 1,4-butanediol | 16.8:373 | A |
| 15 | 1 | 81.3:192 | Polyol E | 19.8:194 | B |
| 16 | 1 | 81.3:192 | Polyol E | 19.8:194 | A |
| 17 | 2 | 68.7:324 | Polyol E | 31.4:308 | B |
| 18 | 2 | 68.7:324 | Polyol E | 31.4:308 | B |
| 19 | 3 | 90.9:215 | 1,4-butanediol | 9.1:202 | B |
| 20 | 3 | 81.3:192 | Polyol E | 18.7:183 | B |
| 21 | 4 | 83.1:394 | 1,4-butanediol | 16.9:376 | B |
| 22 | 4 | 68.5:324 | Polyol E | 31.5:309 | B |
| 23 | 5 | 90.8:215 | 1,4-butanediol | 9.2:204 | B |
| 24 | 5 | 81.3:193 | Polyol E | 18.7:183 | B |
| 25 | 6 | 83.1:394 | 1,4-butanediol | 16.9:376 | B |
| 26 | 6 | 68.5:325 | Polyol E | 31.6:310 | B |
| 27 | 7 | 90.8:214 | 1,4-butanediol | 9.2:204 | B |
| 28 | 7 | 81.4:192 | Polyol E | 18.6:182 | B |
| 29 | 8 | 83.1:394 | 1,4-butanediol | 16.9:375 | B |
| 30 | 8 | 68.5:324 | Polyol E | 31.5:309 | B |
| 31 | 9 | 79.1:309 | 1,4-butanediol | 13.2:294 | B |
| 32 | 9 | 83.6:326 | 1,4-butanediol | 14.0:311 | A |
| 33 | 9 | 57.8:226 | Polyol E | 22.2:218 | A |
| 34 | 9 | 57.8:226 | Polyol E | 22.2:218 | B |
| 35 | 10 | 89.6:561 | Polyol F | 80.2:529 | A |
| 36 | 10 | 89.6:561 | Polyol F | 80.2:529 | B |

Determining Photochromic Behavior of the Polyurethanes

The initial absorbance value ($A_0$) for each plaque was recorded at the $\lambda_{max}$ of the photochromic dye ($\lambda_{max}$ of Dye A=425 nm; $\lambda_{max}$ of Dye B=610 nm). Absorbance is defined as the natural logarithm of the inverse of the ratio of transmitted over incident light intensity and is obtained from transmission spectroscopy. The plaque was then exposed to a hand-held light source (Spectroline Model EN-280 L; 365 nm output). After 1, 2, 4 and 10 minutes of exposure to the light, the optical absorption of the plaque (A) at the $\lambda_{max}$ of the photochromic dye was re-recorded. These values were used to calculate a $\Delta A$ value after each exposure, where $\Delta A$ is defined as $A-A_0$. The value of the $\Delta A$ after 2 minutes was divided by the $\Delta A$ after 10 minutes and multiplied by 100 to give a parameter that indicates the percentage of darkening that occurs within two minutes in the particular matrix. This value ($\Delta A$ @ 2 minutes) for each of the polyurethanes is given in Table 2.

After 10 minutes of exposure to the light source, the sample was placed in the spectrometer and the absorption of the plaque at the $\lambda_{max}$ of the dye was monitored. The time at which the $\Delta A$ value decreased to 50% of its initial value (immediately after the 10 minute illumination) was recorded and is given in Table 2 as the $T_{50}$ for fading of the dye in the particular matrix.

The photochromic performance (darkening and fading behavior) is summarized in Table 2 below. Examples 11–34 show acceptable performance, defined as a $\Delta A$ @ 2 minutes of greater than 50% and a $T_{50}$ of <2 minutes. The comparative Examples 35 and 36, where the polyurethanes were prepared without the requisite high MW component do not have acceptable photochromic performance by this definition.

TABLE 2

Photochromic Behavior of Elastomers from Examples 11–36

| Example | $\Delta A$ @ 2 minutes (% of max) | $T_{50}$ Fade (sec.) |
|---|---|---|
| 11 | 100 | 8 |
| 12 | 94 | 15 |
| 13 | 92 | 30 |
| 14 | 88 | 60 |
| 15 | 87 | 92 |
| 16 | 79 | 15 |
| 17 | 85 | 93 |
| 18 | 89 | 74 |
| 19 | 86 | 3 |
| 20 | 72 | 11 |
| 21 | 83 | 52 |
| 22 | 87 | 73 |
| 23 | 94 | 15 |
| 24 | 100 | 15 |
| 25 | 89 | 99 |
| 26 | 79 | 80 |
| 27 | 90 | 13 |
| 28 | 77 | 12 |
| 29 | 93 | 110 |
| 30 | 88 | 50 |
| 31 | 96 | 30 |
| 32 | 95 | 25 |
| 33 | 97 | 35 |
| 34 | 95 | 35 |
| 35 | 100 | 150 |
| 36 | 83 | 155 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic photochromic polyurethane characterized by a $\Delta A$ at 2 minutes of greater than 50% and a $T_{50}$ of less than 2 minutes consisting essentially of:
   a) an isocyanate reactive mixture consisting essentially of:
      i) from about 40 to about 85% by weight of one or more polyols having a nominal functionality of about 2 and a molecular weight of from 500 to 6000 g/mol;
      ii) from about 15 to about 60% by weight of one or more diols having a functionality of about 2 and a molecular weight of from 62 to 499;
   b) an aliphatic polyisocyanate having a functionality of about 2; and
   c) a photochromic compound selected from a group consisting of spirooxazines, fulgides, fulgimides, and naphthopyrans, wherein the photochromic compound c) is present in an amount of from 0.01 to 5 parts per hundred parts by weight of the isocyanate reactive mixture a).

2. A thermoplastic photochromic polyurethane according to claim 1, wherein said photochromic compound is 3,3-diphenyl-3-H-naphtho (2,1-b)pyran.

3. A thermoplastic photochromic polyurethane according to claim 1, wherein said photochromic compound is 1,3-dihydro-1,3,3-trimethyl-spiro-2H-indole-2,3'-(3H)-naphtho (2,1-b)(1,4)oxazine.

* * * * *